(12) United States Patent  (10) Patent No.: US 9,871,769 B2
Gay et al.  (45) Date of Patent: Jan. 16, 2018

(54) RELATIONSHIP MANAGEMENT SYSTEM AND METHOD OF OPERATION THEREOF

(75) Inventors: Julian Gay, San Francisco, CA (US); Alfred Chioiu, Walnut, CA (US)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 13/820,066

(22) PCT Filed: Aug. 22, 2011

(86) PCT No.: PCT/IB2011/002291
§ 371 (c)(1),
(2), (4) Date: May 15, 2013

(87) PCT Pub. No.: WO2012/028952
PCT Pub. Date: Mar. 8, 2012

(65) Prior Publication Data
US 2013/0227707 A1   Aug. 29, 2013

Related U.S. Application Data

(60) Provisional application No. 61/378,671, filed on Aug. 31, 2010.

(51) Int. Cl.
G06F 7/04 (2006.01)
G06F 17/30 (2006.01)
(Continued)

(52) U.S. Cl.
CPC ......... H04L 63/0421 (2013.01); G06Q 30/02 (2013.01)

(58) Field of Classification Search
CPC ...................................................... G06Q 30/00
(Continued)

(56) References Cited

U.S. PATENT DOCUMENTS

| 8,175,904 B2* | 5/2012 | Templeton .................. 705/7.12 |
| 2006/0075228 A1* | 4/2006 | Black .................. H04L 63/0428 713/167 |

(Continued)

OTHER PUBLICATIONS

Pinaki et al. "Targeted Advertising for Online Social Networks", IEEE, Piscataway, NJ, USA, Jul. 28, 2009 (Jul. 28, 2009), pp. 366-372.*

(Continued)

*Primary Examiner* — Taghi Arani
*Assistant Examiner* — Khalil Naghdali
(74) *Attorney, Agent, or Firm* — David D. Brush; Westman, Champlin & Koehler, P.A.

(57) ABSTRACT

A communication method to publish a user message suitable for one or more vendors. The communication method may be performed by one or more controllers and may include one or more acts of receiving a message from a user station of a user; processing the received message to anonymize the message to conceal an identity of the user; publishing the anonymized message and anonymous link information; receiving a request from a vendor of the one or more vendors for user context information corresponding to the user in response to the published anonymized message; receiving restriction information in accordance with a user persona selected by the user from a plurality of user personas that are each associated with the user; and providing the user context information in accordance with the restriction information.

19 Claims, 14 Drawing Sheets

(51) Int. Cl.
*H04N 7/16* (2011.01)
*H04L 29/06* (2006.01)
*G06Q 30/02* (2012.01)

(58) Field of Classification Search
USPC .................... 726/27, 6; 380/201; 713/176
See application file for complete search history.

(56) References Cited

U.S. PATENT DOCUMENTS

| | | | | |
|---|---|---|---|---|
| 2007/0100863 | A1* | 5/2007 | Shardanand | G06F 17/3089 |
| 2007/0156726 | A1* | 7/2007 | Levy | G06F 17/3002 |
| 2008/0162260 | A1* | 7/2008 | Rohan et al. | 705/10 |
| 2009/0157660 | A1* | 6/2009 | Jung et al. | 707/5 |
| 2009/0177685 | A1* | 7/2009 | Ellis et al. | 707/103 R |
| 2010/0088187 | A1* | 4/2010 | Courtney et al. | 705/14.73 |
| 2010/0106565 | A1* | 4/2010 | Manesh | G06Q 30/0253 |
| | | | | 705/14.51 |
| 2010/0131359 | A1* | 5/2010 | Ting et al. | 705/14.47 |
| 2010/0131366 | A1* | 5/2010 | Gibson | G06Q 30/02 |
| | | | | 705/14.58 |
| 2010/0191661 | A1* | 7/2010 | Pritchett | G06Q 30/0185 |
| | | | | 705/318 |
| 2012/0089410 | A1* | 4/2012 | Mikurak | 705/1.1 |
| 2013/0325870 | A1* | 12/2013 | Rouse et al. | 707/741 |
| 2014/0095323 | A1* | 4/2014 | Vassilvitskii et al. | 705/14.71 |

OTHER PUBLICATIONS

Pinaki Mitra et al: "Targeted Advertising for Online Social Networks", Networked Digital Technologies, 2009, NDT '09. First International Conference on, IEEE, Piscataway, NJ, USA, Jul. 28, 2009 (Jul. 28, 2009), pp. 366-372, XP031533999, ISBN: 978-1-4244-4624-8 the whole document.

Adrien Joly et al: "Contextual Recommendation of Social Updates, a Tag-Based Framework", Active Media Technology, Springer Berlin Heidelberg, Berlin, Heidelberg vol. 6335, Aug. 28, 2010 (Aug. 28, 2010), pp. 436-447, XP019150344, ISBN: 978-3-642-15469-0, the whole document.

International Search Report and Written Opinion dated Feb. 16, 2012 for corresponding International Application No. PCT/IB2011/002291, filed Aug. 22, 2011.

* cited by examiner

1100

1200

RELATIONSHIP MANAGEMENT SYSTEM AND METHOD OF OPERATION THEREOF

CROSS-REFERENCE TO RELATED APPLICATIONS

This Application is a Section 371 National Stage Application of International Application No. PCT/IB2011/002291, filed Aug. 22, 2011, which is incorporated by reference in its entirety and published as WO 2012/028952 on Mar. 8, 2012, in English, which claims the benefit of U.S. Provisional Application No. 61/378,671, Filed Aug. 31, 2010, which is incorporated by reference in its entirety.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE PRESENT SYSTEM

The present system relates generally to a technique for a user to express a need or intent, to express their context and for companies to respond with highly relevant messages or offers.

BACKGROUND OF THE PRESENT SYSTEM

Typically, in a networking environment such as the Internet, advertisers rely upon search engines such as Google™ and the like to disseminate advertising content (e.g., ads) in response to a user query or email. Accordingly, search engines typically conduct a search in accordance with a search query submitted by a user and transmit results of the search and advertising information (e.g., advertisements, etc.) to the user based upon keywords in the search query. However, search engines do not take into account user information such as user profile information to refine the advertising information submitted with the results of the search. Further, advertisers which use search engines such as Google™ to advertise are not presented with information which would enable then to determine whether to submit an ad to a user in real-time.

SUMMARY OF THE PRESENT SYSTEM

In accordance with an aspect of the present system, there is disclosed a communication method to establish a relationship between a user and one or more vendors for one or more vendors. The communication method may be performed by one or more controllers and may include one or more acts of receiving a message from a user station (US) of a user; processing the received message to anonymize the message to conceal an identity of the user; publishing the anonymized message and anonymous link information; receiving a request from a vendor of the one or more vendors for user context information corresponding to the user in response to the published anonymized message; receiving restriction information in accordance with a user persona selected by the user from a plurality of user personas that are each associated with the user; and providing the user context information in accordance with the restriction information.

The method may further include an act of forming the anonymous link information, and associating the anonymous link information with the user. According to the method the user context information may include information obtained by parsing one or more social network (SN) applications to which the user subscribes. Further, the act of parsing may include an act of parsing one or more of user profile information and user message information at the one or more SN applications to which the user subscribes. Moreover, the message may include a message portion and a tag portion.

Further, the method may include an act of determining a context of the current message by determining one or more of an indication of interest need, want, desire, plan, intent, location, and intended destination of the user. According to the method the restriction information may include privacy policy information. Further, the method may include an act of selecting a privacy policy by the user from a plurality of privacy policies that are each associated with the user.

According to yet another aspect of the present system, there is disclosed a communication system to establish a relationship between a user and one or more vendors. The communication system may include at least one controller which may receive a message from a user station (US) of a user; process the received message to anonymize the message to conceal an identity of the user; publish the anonymized message and anonymous link information; receive a request from a vendor for user context information corresponding to the user in response to the published anonymized message; receive restriction information in accordance with a user persona selected by the user from a plurality of user personas that are each associated with the user; and/or provide the user context information in accordance with the restriction information.

According to the system, the at least one controller may associate the anonymous link information with the user and inserts the anonymous link information into the anonymized message. Further, the at least one controller may parse one or more social network (SN) applications to which the user subscribes and forms user context information based upon the parsed information. The at least one controller may further parse one or more of user profile information and user message information at the one or more SN applications to which the user subscribes.

Moreover, according to the system, the at least one controller may form the anonymized message having a message portion and a tag portion. Further, the at least one controller may determine a context of the current message by determining one or more of an indication of interest need, want, desire, plan, intent, location, and intended destination of the user. It is also envisioned that the at least one controller may request a user to select a privacy policy from a plurality of privacy polices associated with the user, and/or update the restriction information in accordance with the selected privacy policy.

There is also disclosed a computer program to establish a relationship between a user and one or more vendors, the computer program stored on a computer readable persistent memory medium, the computer program comprising a program portion configured to: receive a message from a user station (US) of a user; process the received message to anonymize the message to conceal an identity of the user; publish the anonymized message and anonymous link information; receive a request from a vendor for user context information corresponding to the user in response to the published anonymized message; receive restriction information in accordance with a user persona selected by the user from a plurality of user personas that are each associated with the user; and/or provide the user context information in accordance with the restriction information.

The program portion may also be configured to associate the anonymous link information with the user; and/or insert the link information into the anonymized message. Further, the program portion may be configured to: parse one or more social network (SN) applications to which the user subscribes; and/or form user context information based upon the parsed information. It is also envisioned that the program portion may be configured to parse one or more of user profile information and user message information at the one or more SN applications to which the user subscribes.

Moreover, it is envisioned that the program portion may be configured to form the anonymized message having a message portion and a tag portion. Further, the program portion may be configured to determine a context of the current message by determining one or more of an indication of interest need, want, desire, plan, intent, location, and intended destination of the user. The program portion may also be configured to: request a user to select a privacy policy from a plurality of privacy polices associated with the user; and/or update the restriction information in accordance with the selected privacy policy.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

Figure 1:
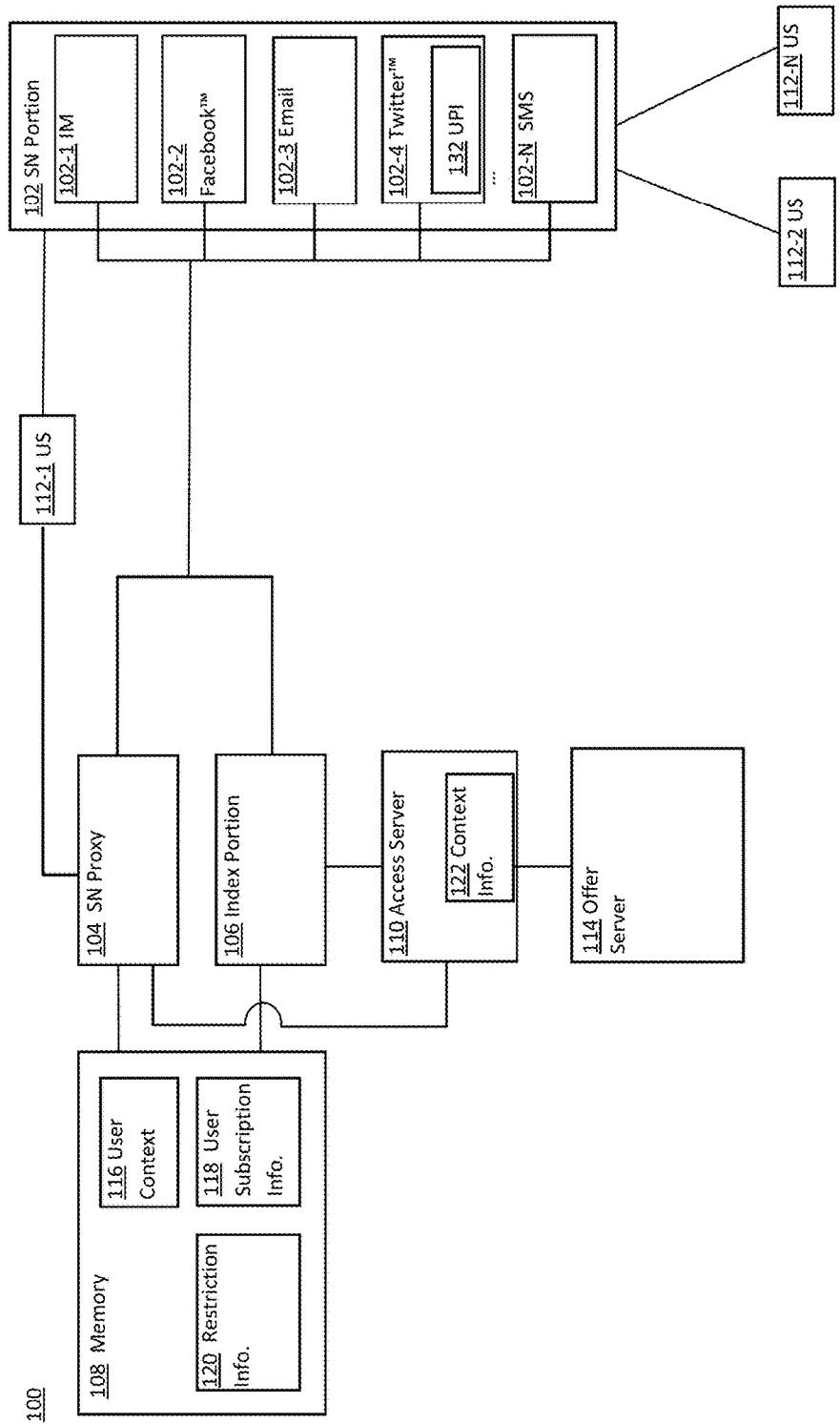
FIG. 1 shows a block diagram of a communication system in accordance with embodiments of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. For example, an operative coupling may include a wired and/or a wireless coupling to enable communication between a content server (e.g., a search engine, etc.) and one or more user devices. A further operative coupling, in accordance with embodiments of the present system may include one or more couplings between two or more user devices, directly or via a network source, such as the content server.

The term rendering and formatives thereof as utilized herein refer to providing content, such as digital media which may include, for example, advertisements, requests, contact lists, contact information, notifications, voice mails, emails, short message service (SMS) messages, calling information, audio information, visual information, audio-visual information, etc., such that it may be perceived by at least one user sense, such as a sense of sight and/or a sense of hearing. For example, the present system may render a user interface (UI) on a display device so that it may be seen and interacted with by a user. Further, the present system may render audio visual content on both of a device that renders audible output (e.g., a speaker, such as a loudspeaker) and a device that renders visual output (e.g., a display). To simplify the following discussion, the term content and formatives thereof will be utilized and should be understood to include audio content, visual content, audio visual content, textual content and/or other content types, unless a particular content type is specifically intended, as may be readily appreciated.

The user interaction with and manipulation of the computer environment may be achieved using any of a variety of types of human-processor interface devices that are operationally coupled to a processor (e.g., a controller) or processors controlling the displayed environment. A common interface device for a user interface (UI), such as a graphical user interface (GUI) is a mouse, trackball, keyboard, touch-sensitive display, a pointing device (e.g., a pen), a haptic device, etc. For example, a mouse may be moved by a user in a planar workspace to move a visual object, such as a cursor, depicted on a two-dimensional display surface in a direct mapping between the position of the user manipulation and the depicted position of the cursor. This is typically known as position control, where the motion of the depicted object directly correlates to motion of the user manipulation.

An example of such a GUI in accordance with embodiments of the present system is a GUI that may be provided by a computer program that may be invoked by the system or user, such as to enable a user to communicate with one or more other users.

FIG. 1 shows a block diagram of a communication system 100 in accordance with embodiments of the present system. The communication system 100 may include one or more of a social network (SN) portion 102, an SN proxy portion 104, an index portion 106, a memory portion 108, an access server portion 110, user stations (USs) 112-1 through 112-N, and an offer server 114, which may be operatively coupled to each other so as to communicate with each other via one or more suitable networks such as the Internet, an intranet, a telephony network, a cellular network, a peer-to-peer network, a wide area network (WAN), a local area network (LAN), etc. and may be local or remotely located from each other.

The USs 112-1 thorough 112-N (generally 112-x) may include any suitable communication device with which a user may communicate with one or more other portions of the system 100 (e.g., the SN proxy 104, the SN portion 102, other USs 112-x, the access portion 110, the memory 108, the offer server 114, etc.) using wired and/or wireless communication methods. Accordingly, USs 112-x may include devices such as, for example, telephony devices (e.g., mobile stations (MSs), cellular phones, softphones (e.g., Internet Protocol (IP) Phones), conventional phones, etc.), personal digital assistances (PDAs) such as, for example, PALM™, RIM™, IPhone™, and other similar types of devices, personal computers (PCs), notebooks, netbooks, computing pads such as an IPad™ or the like, and/or other types of communication devices. Each of the USs 112-x may have one or more contact addresses which may be used to contact the corresponding 112-x. For example, a PDA-type US may be contacted via a telephone number and/or an email, SMS addresses, and/or IP address. One or more of these addresses may be associated with a user. Thus, in accordance with embodiments of the present system, the system may contact a desired user via a desired contact address of one or more contact addresses for each user. Accordingly, the system 100 may also determine a contact address based upon the user's schedule. For example, in a case wherein the system attempts to contact the user during work hours, it may determine to contact the user via a work telephone number of the user. However, in a case wherein the system attempts to contact the user after work hours, the system may determine to contact the user via an email or SMS address of the user. Further, the system may contact the user via a user's social network address to which the user subscribes. Although, the system may include a plurality of users, for the sake of clarity only a single user interaction will be described.

The SN portion 102 may include one or more social networking and/or messaging applications (generally SN portions 102-x) such as, for example, an Internet Messenger (IM) portion 102-1, a Facebook™ (FB) portion 102-2, an email portion 103-2, a Twitter™ portion 102-13, and/or a simple message service (SMS) portion 102-N each of which may be locally and/or remotely located relative to the other and may post and/or transmit messages of a user as is known in the art. For example, a user may post a tweet on the Twitter™ application to which the user subscribes and may transmit a message to a desired contact or group using the Facebook™ application to which the user subscribes. The SN portions 102-x may store information (e.g., historical information such as previous messages (e.g., sent, drafts, deleted, unread, read, tweets, etc.)) related to a user's operation of the corresponding SN portion 102-x in a corresponding memory which may be local and/or remote from the corresponding SN portion 102-x. Further, one or more of the SN portions 102-x may transmit information related to a user's current use (i.e., real-time use) of the corresponding SN portion 102-x. The SN portion 102-x may also include online account applications of the user such as, for example, a service account such as a utility account (e.g., electric company account, a telco account, etc.), a banking account (e.g., an online banking application (e.g., a Citibank™ account, etc.)), etc., which may be accessed to obtain information related to the user (e.g., the corresponding user's account information). The SN portion 102 may also include a schedule portion which may store a schedule of a user and a location portion which determines a current location of the user (e.g., via the user's US, account login, etc.) and may store location information related to a user (e.g., Mar. 2, 2011, in Miami Fla., Mar. 3, 2013, in Detroit Mich., etc.)

With regard to the IM portion 102-1, this portion may include an instant messaging application such as an IM messaging application which may provide messaging features. Thus, for example, the IM portion 102-1 may provide messaging features to one or more users of the system 100. Further, the IM portion 102-1 may perform functions such as, for example, detect the presence of a user at a certain location (e.g., physical and/or logical) and store and/or transmit this information to a desired device (e.g., the SN proxy portion 1013, the index portion 102), or address (e.g., an IP address, etc.). Further, the IM portion 102-1 may store and/or transmit information relating to a user's activities (e.g., a user's IM messages) to a corresponding memory for later use.

With regard to SN applications such as the Facebook™ portion 102-2, and the Twitter™ portion 102-4, these portions may operate in accordance with their respective SN applications as is known in the art. Accordingly, a user may login in to the user's SN subscription (e.g., account) of a corresponding SN application using an account name and corresponding password. However, it is also envisioned that a user may automatically log into the users SN subscription using any other suitable method (e.g., IP address verification, Biometric information, etc.).

With regard to the email portion 102-3, this portion may include one or more email functions for a corresponding user. Accordingly, the email portion 102-3 may provide email applications, email storage, contact lists, etc., to one or more users of the system 100. Further, the email portion 102-3 may perform functions such as, for example, storing (e.g., in a memory of the system) and/or transmitting email information related to one or more users of the system 100. The email portion 102-3 may operate with local (e.g., Outlook™) and/or web-based (e.g., Gmail™, etc.) email systems. Accordingly, the email portion 102-3 may include, for example, a user's work email, the user's home email, etc., as set by the user.

With regard to the SMS portion 102-N, this portion may include one or more applications which may provide an SMS messaging application to a corresponding user of the system 100 and may include a memory to store information generated by the user and/or SMS portion 102-N.

The SN portion 102 may include one or more servers to receive queries such as, for example, research description framework (RDF) queries and/or return corresponding results to a requesting device such as the SN proxy portion 104 or Index portion 106 which may form and/or transmit the RDF queries.

The memory portion 108 may include any suitable memory medium or mediums which may store information required by the system. The memory portion 108 may include local, remote, and/or distributed memories. For example, it is envisioned that the memory portion 108 may include a distributed memory such as a surface area network (SAN), etc. The memory portion 108 may include a user context information portion 116, a user subscription information portion 118, and a restriction portion 120 as will be discussed below. Each of the user context information portion 116, the user subscription information portion 118, and the restriction portion 120 may be combined with together or separated into further parts as may be readily appreciated. Further, information contained in the memory portion 108 may be formed and/or updated by the system 100 and/or the user as is discussed herein. In addition, each of these portions may store information in accordance with a desired format or formats (e.g., the RDF format) as is discussed herein. The user context information portion 116 may include information user context information as is discussed herein.

The user subscription information portion 118 may store information related to a user's subscriptions to one or more SN applications. Accordingly, the user subscription information may store user identification information (e.g., name, account name, screen name, company name, etc.) and corresponding account identification (IDs) and password information which may be accessed by the system to login to a user's SN application. Thus, the user may login to the SN proxy portion 104 and thereafter the SN proxy portion 104 may login to one or more of the SN portions 102-x.

The restriction portion 120 may store restriction information such as information related to a user's preferred access and/or privacy settings, etc. Accordingly, the restriction information may include information related to a privacy policy, a profile (e.g., a persona), etc., of the user. The index portion 106 may obtain user subscription information from the user subscription information portion 118, and may use this information to login to one or more of the SN portions 102 and/or to access a user's account in an SN portion 102-x.

The index portion 106 may include an aggregator which may aggregate information (such as user context information) obtained using, for example, a crawler (e.g., an internal crawler, a web crawler, etc.) which may crawl for desired information from any suitable SN source (e.g., within the system 100 and/or external of the system (100) of the user. For example, the crawler may crawl selected SN portions 102-x such as, for example, the Facebook™ portion 102-2 for information related to the user's SN subscription (e.g., preferences, friends, shopping habits, property (e.g., personal property such as TVs, Stereos, USs, Automobiles, etc.), location information, schedule information, etc. The index portion 106 may index and/or correlate information corresponding to information in one or more of the user's SN portions 102-x in accordance with, for example, one or more statistical and/or semantic techniques such as, for example, a research description framework (RDF) and may store this information as, for example, user context information in a suitable format (e.g., an RDF format) in a memory of the system (e.g., the user context portion 116). The crawler may also crawl the SN portion 102 for protected resource information (e.g., which may include, for example, information such as financial (e.g., bank account information, credit score information, etc.), biometric (e.g., birthday, social security number, etc.), utility information (e.g., telco information, Internet provider, cable provider, energy providers, water/sewer provider, etc.), employment information (e.g., employment data, employer data, etc.), and/or other private information which may not be publicly available. Accordingly, the user may determine which information or classes of information (e.g., biometric data, no financial information, etc.) which may be available for searching and store corresponding information as index setting information in a memory of the system as, for example, the memory 108. The crawler may perform a search in accordance with the index setting information. Further, the system 100 may index information in accordance with the index setting information. For example, any information related to an exact birthday, etc. of the user will not be stored by the system. It is also envisioned that default index settings (e.g., set by the system 100 or the user) may also be included. Accordingly, for example, the system may index information related to a user's age while the user's exact birthday may be indexed absent explicit permission from a user) which may be provided using a protocol such as OAuth.

The index portion 106 may operate at predetermined times such as, for example, in a periodic, or semi-periodic manner or when called by another application (e.g., when user context information is requested). The index portion 106 may transmit information that it generates (e.g., the user context information, etc.) to a suitable memory such as the user context information portion 116 for storage. The index portion 106 may operate in accordance with one or more algorithms such as, for example, prediction algorithms, etc., so that index portion 106 may analyze information stored in one or more memories of the system 100 such as, for example, the SN portions 102-x to obtain desired information (e.g., Facebook™, Twitter™, email information, IM information, user location information, user status, schedule information, etc.) and semantically index this information for later use. Thus, all (or selected) information within an enterprise such as, for example, the communication system 100 may be semantically indexed and may be stored (e.g., as user context information) for later use which may enhance information retrieval efficiency when an issue is detected. However, it is also envisioned that all or part of the user context information may be dynamically formed in real time, if desired (e.g., after receiving a request for user context information). Further, the user context information may include weights which may be used to filter and/or prioritize the user context information.

The SN proxy 104 may provide an interface with which the user may access one or more of the SN portions 102-x. Accordingly, a user of, for example, the US 112-1 may access (e.g., by logging in using a unified access ID and/or a corresponding password) the SN Proxy 104 and automatically login to one or more of the SN applications to which a user has subscribed so that the user may interact with (e.g., use) a desired SN application 102-x. Accordingly, the SN proxy 104 may access the user subscription information portion 118 and may obtain information related to a user's subscriptions to one or more SN applications such as account name and/or password information to login to desired SN portions 102-x.

Figure 9:
FIG. 9 shows a screen shot of an SN page in accordance with embodiments of the present system.

The SN proxy portion 104 may receive a message to be posted from the user and may post the message (e.g., as a current message) using one or more desired SN applications such as the Facebook™ application 102-2 and corresponding server, etc. The message may include address, page information indicating a page (or pages) on which the message should be posted, a channel, etc. For example, with respect to the page information, the user may request that the message be posted on a "planningtobuy" page or feed (hereinafter both of which will be referred to as a page unless the context indicates otherwise) as shown in FIG. 9 below. Accordingly, the SN proxy portion 104 may also parse the message for the page information (for example, within the body of the message) and, after determining the page information, may post the message at the requested page. Further, in accordance with embodiments of the present system, the SN proxy portion 104 may remove user identifying information from the message such that the message may be posted anonymously herein termed "anonymizing" and/or formatives thereof.

It is also envisioned that the SN proxy portion 104 may monitor one or more of the SN portions 102-$x$ to detect whether a current message has been posted and/or transmitted (hereinafter both of which will be referred to as posted unless the context indicates otherwise) on an SN application 102-$x$ of the user. The current message may include postings or messages such as a Facebook™ message, a Twitter™ message (e.g., a tweet), an email, an SMS, etc., which may be posted on a personal webpage of the user or transmitted to one or more pages (e.g., the "planningtobuy" page), contacts (e.g., other users) or groups (e.g., groups of user's, etc.), depending upon a message type. Accordingly, when the SN proxy portion 104 detects that a current message has been posted by an SN application 102-$x$ of the user, the SN proxy 104 may parse the current message and determine a context of the current message. Then, the SN proxy portion 104 may form context information in accordance with the context of the current message and/or the user context information (e.g., retrieved from the user context portion 116 of the memory portion 108). Accordingly, the SN proxy portion 104 may use statistical and/or semantic techniques to process the current message (e.g., parse, identify terms, etc.) to determine the context of the current message. Further, the context information may be processed in accordance with the restriction information as described herein. The SN proxy portion 104 may transmit and/or store the context information as filtered information in a memory of the system such as a context information memory 122 of the access server 110 for later use (e.g., retrieval by access server 110).

The SN proxy 104 may include a location portion to determine information related to a location (e.g., geophysical and/or logical) of one or more users of the system 100 and may store this information in a memory for later use or transmit this information to a desired location such as to a server requesting user context information. Accordingly, the location portion may report real-time location information for one or more users of the system 100. The location of the user may be determined using any suitable location method (e.g., Global Positioning System (GPS), Triangulation, etc.) and may be performed upon the occurrence of an event (e.g., message posting, etc.) and/or at a predetermined time interval (e.g., every 5 minutes, etc.).

The access server 110 may include the context memory 122 which may be local and/or remotely located. Accordingly, the access server may receive the context information from the SN proxy portion 104 and may store the context information in the context memory 122 for access by the offer server 114, third party providers, etc. The access server 110 may include an accounting/authorization portion which may provide access to one or more portions of the context information in the context memory 122 based upon, for example, a fee schedule, to one or more third party vendors such as, for example, the offer server 114. Further, the context information in the context memory 122 may be processed such that it is in accord with the restriction information. The offer server 114 may include functionality such that it may operate in accordance with a social CRM system which may monitor (e.g., select pages, sites, addresses, etc.) for messages which may include information (keywords, etc.) related to products or services which one or more vendors may offer.

The offer server 114 may access the access server 110 and obtain the context information in the context memory 122. Access to one or more parts of the context information may be controlled in accordance with access restrictions controlled by, for example, the accounting/authorization portion of the access server 110. The offer server 114 may filter the context information in accordance with one or more filtering techniques and select engagement content (for example advertising, or solicitation for more information) to present to the user. For example, the offer server 114 may filter the context information in accordance with customer relationship management (CRM) information included in a CRM database of the offer server 114. To protect the privacy of the user, the offer server 114 may transmit the selected engagement content to the SN proxy 104 (e.g., via the access server 110) which may then transmit the engagement content to a contact address of the user such as the US 112-1. Accordingly, the user may then determine whether to establish a direct communication with the offer server 114 or may respond to an address described in the engagement content, if desired. The user may also access the restriction information and change one or more settings to allow certain engagement content and/or vendors to transmit information directly to one or more addresses of the user such as the US 112-1. Further, the offer server 114 may generate leads which may be forwarded to vendors (e.g., consumed by vendors) such as third party vendors and/or may be anonymously be published as described further herein. The third party vendors may include, for example, advertising servers, lead servers, etc.

Further, the access server 110 may generate feedback learning information (e.g., learning information) which may return feedback (FDBK) information such as, for example, whether a user interacted with the engagement content, used a service promoted by the engagement content (e.g., a restaurant, etc.), etc. and transmit this information to the index portion 106 which may updated the user context information 116 in accordance with the FDBK information.

Accordingly, the present system may determine whether a user has posted an SN message on a SN application of the user, determine a context of the SN message, and may select one or more engagement messages and/or publish an anonymous message for third party vendors based upon a context of the SN message and user context information in an expedient and timely manner.

Processes performed by embodiments of the present system which may be performed using one or more computers communicating over a network will be described below with reference to FIGS. 2 through 6. These processes may include one of more of the corresponding acts. Further, the acts of each corresponding processes may be combined and/or separated into sub-acts, if desired.

Figure 2:
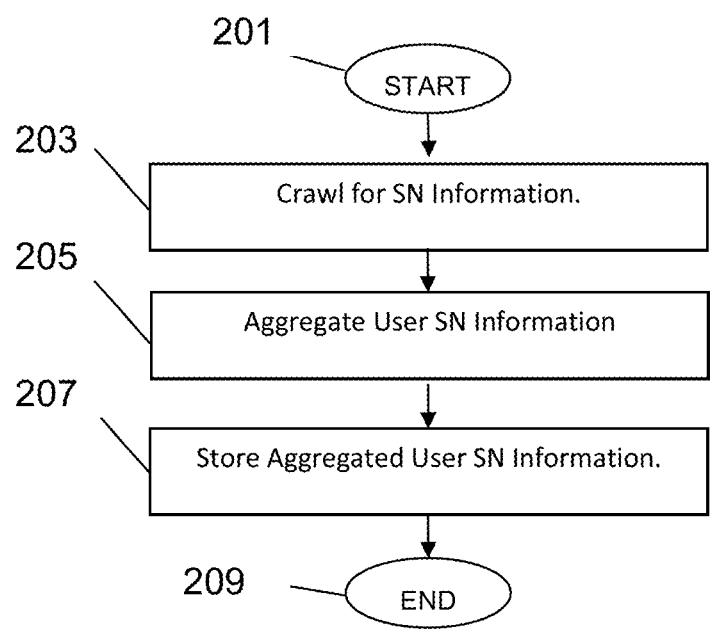
FIG. 2 shows a flow diagram that illustrates a process in accordance with embodiments of the present system.

A process illustrating one or more operations performed by, for example, an index portion (and/or other portions) of the present system is illustrated below with reference to FIG. 2 which shows a flow diagram that illustrates a process 200 in accordance with embodiments of the present system. Process 200 may start during act 201 and then proceed to act 203.

During act 203, the process may analyze/search information from various SN portions 102-$x$ of the user (e.g., using a crawler application searching various SN account information such as messages, posts, tweets, emails, SMS messages, IM messages, etc.). This act may be performed in response to an action or event (e.g., updating a user profile) and/or at a certain periodic or non-periodic intervals (e.g., every 24 hours, etc.). The process may also crawl a user's commercial account information such as, for example, telephone company information (e.g., to obtain a contact list, minutes talked per month, etc.), bank information (e.g., to obtain preferred banking relationships (e.g., CitiBank™, etc., which, for example, may be used to obtain a competitive mortgage using the present system). After completing act 203, the process may continue to act 205.

During act 205, the indexer may process the SN information and form user context information and restriction information. The restriction information may include information related to a corresponding user's privacy policy and profile each of which may be used to filter the user context information when the context information is released to a third party such as the a vendor, etc., as will be discussed herein. The user context information and restriction information may be formed in accordance with one or more suitable protocols such as, for example, an RDF protocol. After completing act 205, the process may continue to act 207.

During act 207, the process may store the user context information and the restriction information in accordance with one or more desired formats such as, an RDF format compatible with the RDF protocol, in a memory of the system (e.g., in the user context information portion 116 and the restriction information portion 120, respectively). After completing act 207, the process may continue to act 209, where it ends.

Figure 3:
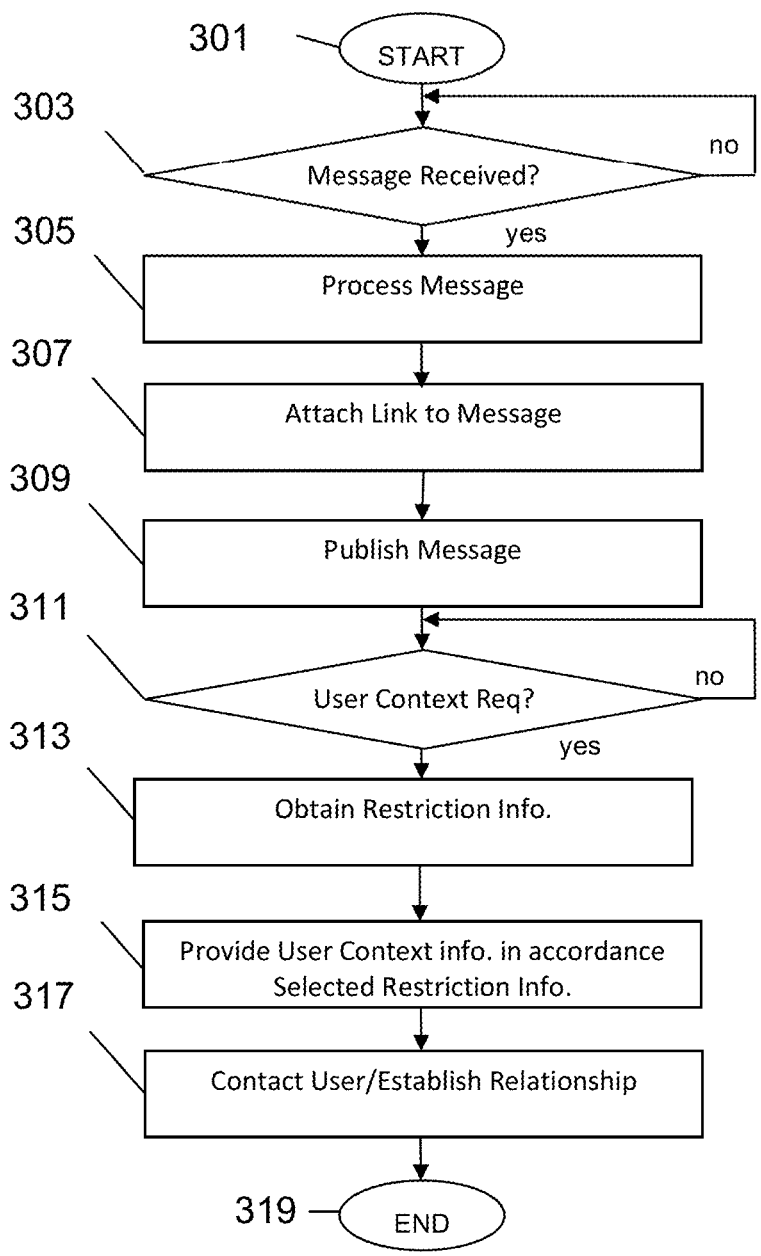
FIG. 3 shows a flow diagram that illustrates a process in accordance with embodiments of the present system.

FIG. 3 shows a flow diagram that illustrates a process 300 in accordance with embodiments of the present system. In operation, the process may start during act 301 and then proceed to act 303.

During act 303, the process may determine whether a message for publication (e.g., a message published using a SN application) was received by the system. In accordance with embodiments of the present system, a message that is published to an SN site publishes to that site as is typical (e.g., a message published to Twitter™) so will not generally be discussed further herein. As such, when publication is discussed herein, this discussion is intended to encompass publication within the present system although it should be clear that publication on an SN site may also occur as is typical. Accordingly, if the process determines that a message for publication was received, the process may continue to act 305. However, if the process determines that a message for publication was not received, the process may repeat act 303. The message for publication may be received from a user via, for example, the user's US and may include a desired format (e.g., see, FIG. 9 below). For example, a suitable message format (both before and after processing for publication) for a SN application such as Facebook™ and other compatible SN applications may be shown in Table 1 below.

TABLE 1

| SN Message Format (before processing for publication) | SN Message Format (post processing for publication) |
|---|---|
| Body Information (e.g., Intention, etc.) | Body Information (e.g., Intention etc.) Tag information (e.g., 'Hashtag') Context link |

The SN message format before processing may include information such as an SN name (e.g., corresponding with an SN account to which the user subscribes), etc., which may be used to identify the SN account and/or the user. Tables 2 and 3 illustrate a message submitted both before and after processing, respectively.

TABLE 2

| Message For Publication before processing |
|---|
| Can someone help me find a good Plasma TV for watching sports? |

TABLE 3

| Message For Publication after processing |
|---|
| Can someone help me find a good Plasma TV for watching sports? # planning http://demo.4th.com/context/qri 4TY 5:23 PM Aug $12^{th}$ via API |

With respect to Table 3, the processing step may also include adding data and/or time (e.g., of submission, processing, etc.) information, etc.

However, it is also envisioned that the message may be automatically formed by a portion of the present system in response to an event. For example, a scheduling program may generate an alarm (e.g., 12 hours to flight to Chicago, for dinner, etc.). The system detecting that the message includes an intended location for the user may form a message in accordance with embodiments of the present system for publication, for example on an SN site (e.g., in accordance with one or more message protocols as described herein, this message is in addition to any message that may be published by an interaction with an SN application as is typical, such as publication of a Tweet) and transmit this message to the SN site and/or other publication site in accordance with predetermined restriction settings (e.g. user persona) of the user, etc.

During act 305, the SN message may be processed to determine an intention of the user which may be included in the body portion of the message and to determine tag information in a tag information portion of the message. What is meant by the term "intention" and formatives thereof as utilized herein is described for example further herein below. The tag information may include a tag such as a hashtag (e.g., "#hashtag") Examples of an intentions and tag information are described herein. The process may also remove information identifying the user. This process is described herein as "anonymizing" the (SN) message or the like. After completing act 305, the process may continue to act 307.

During act 307, the process may attach a link information (e.g., see, context link 906 FIG. 9) to the SN message such that certain information (e.g., user context information in accordance with user security settings, etc.) corresponding to the user of the message may be provided if requested by, for example, a vendor. The link information may include an address or link, a web site, a memory location, an identifying code, etc., which may be used to obtain user context information corresponding with the user (and may be specific to the message or may be specific to the user). For example, the link may include an address of a page at which a third party (e.g., a vendor, etc.) may obtain user context information corresponding with the user. After completing act 307, the process may continue to act 309.

During act 309, the process may anonymously publish the SN message (with the link information) on different platforms such as SN platforms, e.g. at an address indicated in the tag section of the SN message (e.g., see, "planning" FIG. 9). By anonymously, one may understand that references to the user are omitted so that his privacy may be ensured. The message may also be published at an SN address of the user or some other address, if selected by the user. The anonymity may be ensured by associating the message with a temporary email address for the user, like the addresses available today on Craig's List or an anonymous SN account. An anonymous SN account may be an account that does not give any indication of who the owner may be. The process may continue e.g. by publishing the messages on anonymous Twitter™ or Facebook™ accounts (associated to the user or a group of users) that a vendor can monitor. After completing act 309, the process may continue to act 311.

During act 311, the process may determine whether user context information for the (published) SN message is requested. Accordingly, if the process determines that the user context information for the SN message is requested, the process may continue to act 313. However, if the process determines that the user context information for the SN message is not requested, the process may repeat act 311. A request for the user context information may be submitted by the system, a third party vendor (e.g., see, 114, 408, etc.) may be submitted using the link information, etc., for example by selecting the link in the message or by submitting link information to a server of the system. In accordance with an embodiment of the present system, requests for user context information may be filtered and or prioritized such that, for example, a user is not contacted by an unsuitable vendor/third party even should that party request the user context information. For example, in a case where a user has selected a setting to exclude a given vendor or group of vendors (e.g., real estate agents), then the system will not forward the user context information to a real estate agent vendor even should a real estate vendor request the user context information. In accordance with embodiments of the present system, the vendor/third parties may be grouped together to prioritize (e.g., weight) requests to identify the most suitable requests (e.g., based on vendors satisfaction rating) so that in a case wherein many vendor/third party requests are made, only a portion of the requests may be responded to (or be responded to first, with subsequent groups responded to thereafter) with the user context information. Following a request from a vendor, the process may keep a record in a memory of the system which vendor used the link information for the user.

During act 313, the process may verify and/or obtain restriction information corresponding with the user from a memory of the system. The restriction information may include information related to a user's privacy policy, etc., as shown with reference to the description of FIGS. 7 and 8. The restriction information may be set in accordance with a user's setting and/or a setting of the system (e.g., a default setting, etc.). After completing act 313, the process may continue to act 315.

During act 315, the process may provide (e.g., by transmitting, sending, allowing access to, etc.) the user context information to the requesting party (e.g., the vendor 114, 408, etc.) in accordance with the settings of the restriction information. Accordingly, the process may filter the user context information in accordance with the restriction information such that certain user context information is obscured and cannot be obtained by the requesting party (e.g., see, 700, 800, FIGS. 7 and 8) if this is in compliance with the restriction information. After completing act 315, the process may continue to act 317. The user may make selections to the restriction information by, for example, setting a privacy policy, setting/selecting a persona of a plurality of personas that are associated with the user (e.g., predetermined, preselected, etc.), and in other ways that may be suitably applied. The user may set/select the restriction information at any time. For example, after the process determines that the user context information is requested by a third party, the process may provide the user with information identifying the third party, then the user may select a privacy setting and/or a persona to use. The user may also set the restriction information such that the user's context information will not be disclosed to the third party vendor.

During act 317, the party requesting the user context information may transmit desired information (e.g., an advertising content, offers, etc.) to the user. Accordingly, the user may then determine whether to accept an offer in the advertising content, etc., and/or to establish a relationship (e.g., a trust relationship, correspond and/or respond otherwise) with the party requesting the user context information such as the vendor. After completing act 317, the process may continue to act 319 where it ends. For instance the relationship may be established either when a transaction is achieved (an offer has been accepted by the user), or when the vendor starts monitoring the anonymous Twitter™ or Facebook™ account the SN messages are published on.

Figure 7:
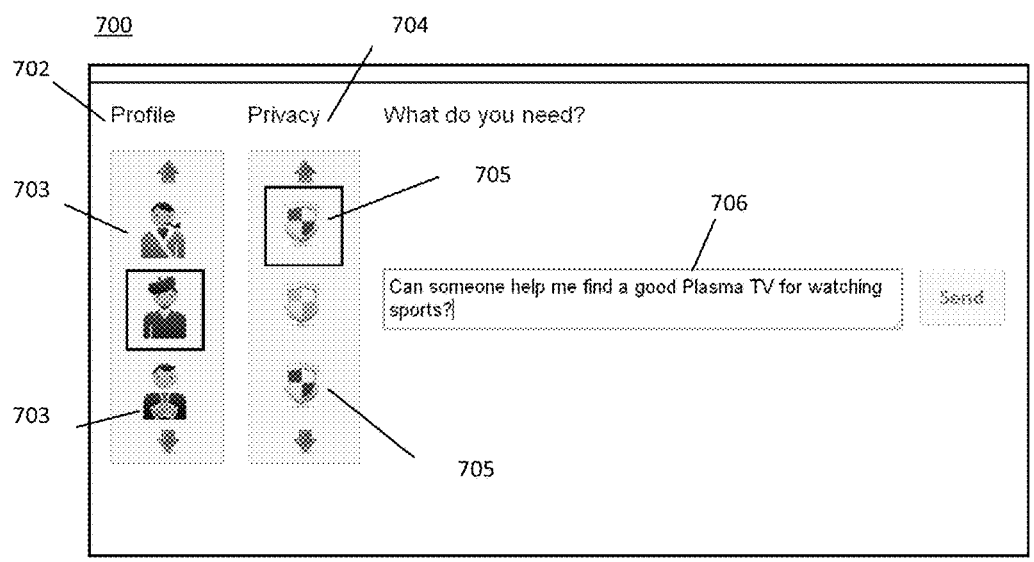
FIG. 7 shows a screen shot of menu items presented to the user in accordance with embodiments of the present system.
Figure 8:
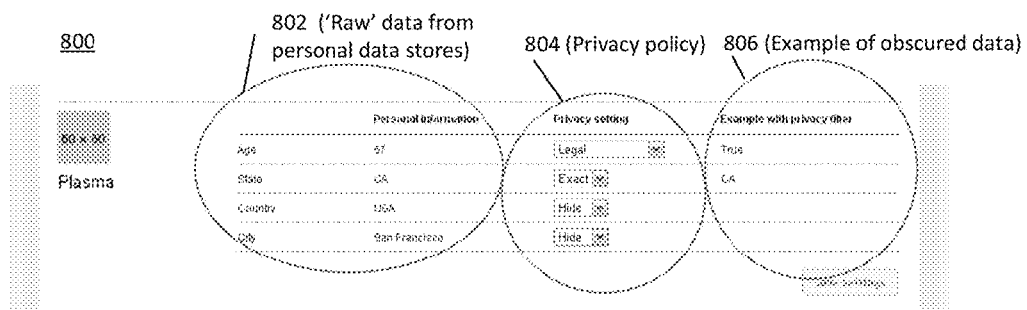
FIG. 8 shows a screen shot of a menu items presented to a user in accordance with embodiments of the present system.

In accordance with embodiments of the present system, a trust relationship between an individual (e.g., a user of a SN application) and a business (e.g., a third party such as a vendor, advertiser, etc.) may be established and/or controlled by intention, context (information) and privacy policy/persona:

Intention—the body of a message transmitted by the user (e.g., "does someone know who can replace a fender on my car", "which TV should I buy?", needs, wants, desires, plans of the user, indication of interest of the user, location of the user (or US of the user), intended destination of the user (e.g., movies at 10 pm tonight); other information placed in a message Context—a collective of user information based on a plurality of SN content and/or sources, user address, location, bank balance, social influence, sex (e.g., M/F), etc., age, demographics, credit score, etc., that may be inferred from a collection of your SN activity, e.g., SN profile, messages, etc., e.g., "the user owns a Suzaru, Type GTS" based on prior messages (e.g., one message expressing the make and another expressing the type of vehicle owned) to the SN portion 410 from the user Privacy policy/persona—a plurality of settings which control what information may be released/published to a vendor (e.g., see, FIGS. 7 and 8)

The users' Intention, Context, and Privacy Policy/Persona may be used in accordance with embodiments of the present system to control the interaction between user and advertiser in accordance, with for example, three illustrative scenarios which will be explained with reference to FIGS. 4 through 6 below, wherein a method of initiating or establishing a relationship between the advertiser and the user will be described with reference to FIG. 4; a method of using a relationship will be described with reference to FIG. 5; and a method of maintaining a relationship between the advertiser and the user will be described with reference to FIG. 6. In accordance with embodiments of the present system, the user and advertiser may initiate (or establish), and thereafter use, and/or maintain a customer business relationship.

Figure 4:
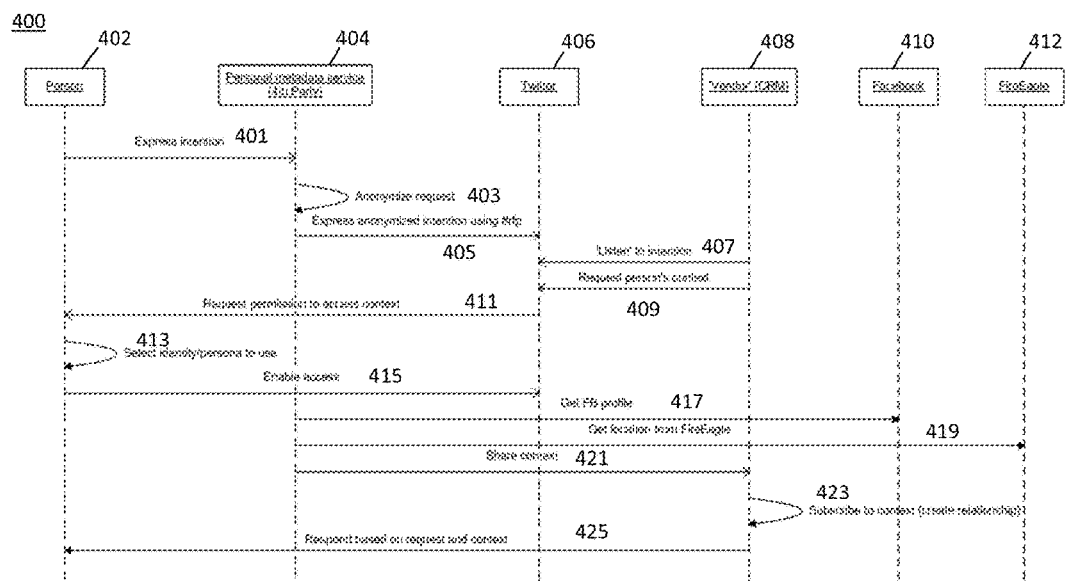
FIG. 4 shows a flow diagram that illustrates a process in accordance with embodiments of the present system.

FIG. 4 shows a flow diagram that illustrates a process 400 in accordance with embodiments of the present system. The process may be performed by one or more portions such as a US 402 of the user, an SN proxy portion 404 (e.g., a personal metadata service), SN application portions 406 and 410, a vendor portion 408, and a location application 412 such as Fire Eagle™ with a location of the user may be registered.

In operation, the process may start during act 401 during which the user may transmit a message including message information such as an intent, (e.g., "can someone help me find a good Plasma TV for watching sports?", "does someone know who can replace a fender on my car", etc., e.g., see, FIG. 7) from the US 402 to the SN proxy portion 404. The message information may also be referred to as a request for proposal (RFP). Then the process may continue to act 403.

During act 403, the SN proxy portion 404 may obtain information related to the user such as user context information which may include user restriction information (e.g., which may include user policy settings), user subscription information, etc. from a memory of the system (e.g., see, memory 108) and determine appropriate settings. For example, in the present example, the SN proxy portion 404 determines that the user has set the user restriction information in accordance with an anonymous (or non-identifying) setting. The system may provide the user with a menu such as a privacy menu 704 shown in FIG. 7 below and which may include a plurality of privacy settings (e.g., shown as selection items 705) which may be selected by the user to select a desired privacy settings. The privacy settings may be presented to the user for selection each time or may be previously set by the user. Further, a default privacy setting may also be selected or used.

Accordingly, the SN proxy portion 404 may anonymously release information related to the user such that the user may not be easily identified. Then, the process may continue to act 405.

During act 405, the SN proxy portion 404 may process the users message (e.g., see act 401) in accordance with the anonymous setting and may publish the message on different platforms, e.g. it may transmit the processed message (e.g., including link information to the user context information) to an identified SN application to which the user subscribes such as the Twitter™ application portion 406. Alternatively, the SM message may be published on anonymous Twitter™ or Facebook™ accounts controlled by the SN proxy portion 404. In the present example, the processed message may express an anonymous (e.g., an anonymized) intention using a "#rfp" format which is compatible with the receiving SN application (e.g., Twitter™ in the present example). However, other formats are also envisioned using other descriptors such as "#intention", "#plan" or other mediums such as email, SMS, IM. After completing act 405, the process may continue to act 407.

During act 407, the vendor portion 408 may listen to the user's intention by monitoring the user's SN application (e.g., the Twitter application portion 406) and obtain the anonymized intention (e.g., the message "does someone know who can replace a fender on my car" without information that would identify the user to the vendor). Then, during act 409, the vendor portion 408 may request (e.g., if interested) the user context information corresponding with the user from an application which transmitted or posted the users intention (e.g., the anonymized intention in the present example) such as, for example, the Twitter application 406.

As the user's intention can be posted anonymously (or with limited detail), the vendor portion 408 may request further information such as user context information which may be used to identify suitable vendor(s)/third parties that may be transmitted to the user. Accordingly, the process may request the user context information from the SN application portion 406 during act 409. Then, in response to the request for the user context information, the SN application portion 406 may transmit a request to the US 402 for permission to access the user context information during act 411.

Accordingly, the process may render a UI on the US 402 which may include selection items for a user to select to grant permission and/or select an identity/persona to use during act 413. This process may be performed in accordance with a request from the PN proxy portion 404. Accordingly, the US 402 may render a menu selection such as is illustrated by menu 702 of FIG. 7 below for selection by the user. Thus, a user may select a persona from a plurality of personas (e.g., each of which may be associated with the user) for user with the current process.

Then, the user may grant permission and/or transmit a desired identity/persona (e.g., single, female, 25 yr old, etc.) by transmitting context information including granted permission, privacy policy settings of the user and/or identity/persona information to the requesting SN application portion 406 during act 415.

During acts 417-419, the process may obtain user context information related to the user from one or more portions of the system, such as the SN portion 410, location portion 412 and/or memory of the system. This act may be obtained in response to the request or may obtained previously or continuously from the user, from user applications (e.g., Twitter feed), etc.

During act 417, the SN proxy portion 404 may obtain user context information, such as a user profile (e.g., Facebook™ profile information) collected/received from the SN portion 410. For example, in a case wherein a user expressed an intention (e.g., "does someone know who can replace a fender on my car", see act 401), the user context information may indicate that the user owns a Suzaru, Type GTS based on one or more prior messages to the SN portion 410 from the user. Other user context information may also be obtained.

During act 419, the SN proxy portion 404 may obtain location information of the US 402 (or user) from a location service such as the location application 412 (e.g., a Fire Eagle™ application) to which the user subscribes. The location service may obtain the location of the user using any suitable location method (e.g., GPS, triangulation, IP address, user set address, etc.). Accordingly, the SN proxy portion 404 may transmit a request to the location application 412 which may include information identifying the MS or the user. This information may also be encrypted or otherwise processed to hide an identity of the user, if desired.

Then, during act 421, the process may share the user context information in accordance with one or more of the selected persona and restriction information, by, for example, transmitting user context information obtained by the SN proxy portion 404 to the vendor portion 408.

Then, during act 423, process may then create a relationship between a vendor and the user by subscribing to the user context information. Subscribing creates a connection ("context connection") between the user's data and the vendor's system, but the information is not necessarily accessed or acted upon at this time.

Then, at act 425, the vendor may respond to the user and transit selected content (e.g., advertisement content) from the vendor portion 408 to the US 402.

In this way, a user-vendor relationship may be established in accordance with embodiments of the present system.

Figure 5:
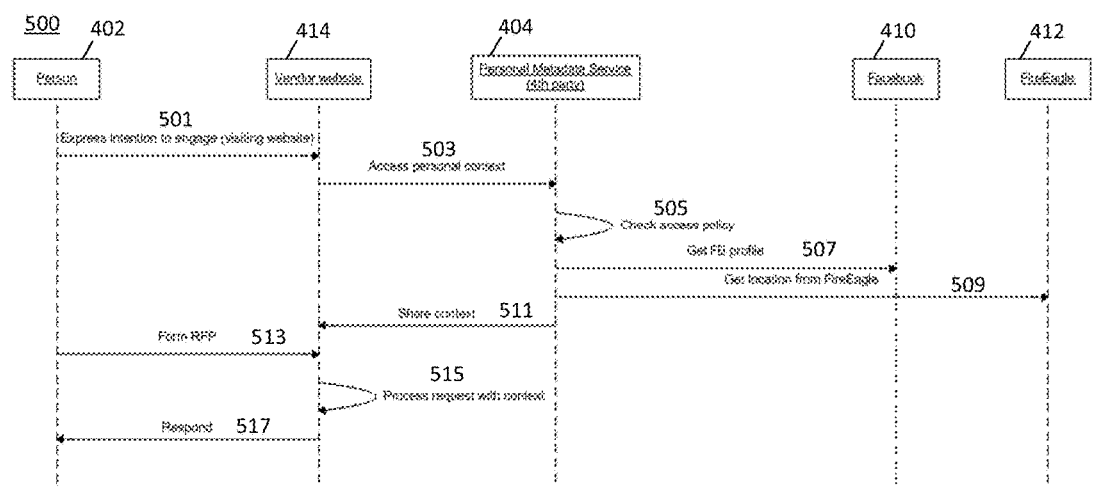
FIG. 5 shows a flow diagram that illustrates a process in accordance with embodiments of the present system.

FIG. 5 shows a flow diagram that illustrates a process 500 in accordance with embodiments of the present system. In operation, the process may start during act 501 where the US 402 may transmit an engagement message to express the user's desire to engage in communications with a website of a vendor 414, utilizing the "context connection" created during the process described in FIG. 4.

Then, during act 503, the vendor website may request access to user context information from the SN proxy portion 404. Then during act 505, in response to the received request to access the user context information, the SN proxy portion 404 may check an access policy set by the user by determining access conditions in the restriction information of the user (e.g., privacy policy/persona). During act 507, the SN proxy portion 404 may obtain user context information (e.g., which may include user profile information such as a Facebook™ profile) from the SN application 410. During act 509, the SN proxy portion 404 may obtain location information of the user from a location service such as the location application 412 to which the user subscribes. The location service may obtain the location of the user using any suitable location method (e.g., GPS, triangulation, IP address, user set address, etc.).

During act 511, the SN proxy portion 404 may transmit user context information to the vendor website 414. During act 513, the US 402 may form and thereafter transmit a request message such as a request for proposal (RFP) form information to the vendor website 414. During act 515, the vendor website 414 may process the RFP form information in accordance with the user context information. During act 517, the vendor portion 424 may respond to the RFP form information in accordance with the user context information. In this way and in accordance with embodiments of the present system, a user may use an established business relationship with one or more vendors.

Figure 6:
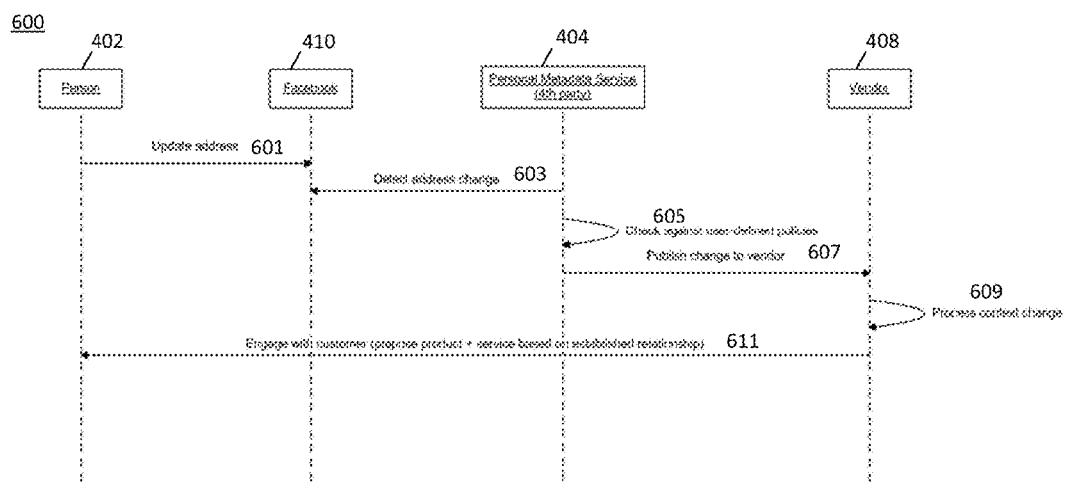
FIG. 6 shows a flow diagram that illustrates a process 600 in accordance with embodiments of the present system.

FIG. 6 shows a flow diagram that illustrates a process 600 in accordance with embodiments of the present system. In operation, the process may start during act 601 wherein the user may submit updated (e.g., new or changed) user profile information such as an updated address to an SN application of the user such as SN application 410. Then, during act 603, the PN proxy portion 404 may detect (e.g., by monitoring) updated user profile information of the user by monitoring the SN application 410.

During act 605, the SN proxy portion 404 may check user defined policies set by the user or by determining access conditions in the restriction information of the user set in the updated user context information. Then during act 607, the process may publish the updated user profile information to the vendor portion 408. During act 609, the vendor portion 408 may process the updated user context information and update its CRM information in accordance with the updated user context information. During act 611 the vendor portion 408 may communicate with the user via the US 402 to, for example, propose products, services, etc., in accordance with the established relationship and the updated user profile information. Accordingly, a relationship between the user and the vendor (e.g., an advertiser) may be updated with current information either automatically or at the request of a user.

FIG. 7 shows a screen shot 700 of menu items presented to the user in accordance with embodiments of the present system. With reference to FIG. 7, menu 702 may include a persona menu which may include a plurality of persona selection items 703 that are associated with the user and which may be selected by a user. In accordance with embodiments of the present system, each of the persona selection items 703 are associated with the user and may represent different personalities that the user may select to represent their persona at a given time.

When, the system determines that a user has double clicked or otherwise selected to view a persona menu item 703, the system may render information related to the corresponding persona menu item 703. In accordance with embodiments of the present system, the persona menu items may be represented as icons. In the present example, the top icon may indicate a persona corresponding with a user that is relaxing in the home, the middle icon may indicate a personal of the user as an artesian (e.g., indicating that the user is interested in going out and visiting museums, for example). The lowermost icon may indicate a persona corresponding with the user socializing with friends, going out, etc. The user and/or the system may select and/or define the plurality of personas that are associated with the user. For example, the system in accordance with embodiments of the present system, may create/associate one or more profiles with the user based on a selection of a pre-established profile by the user. For example, the lowermost icon may be provided to the user amongst other personas for selection by the user. In accordance with these embodiments, each persona may act as a filter for vendor offers. For example, in a case wherein the user has selected the topmost persona, and has indicated an intent to watch a movie, may result to offers for event such as pay-per-view offered by an Internet company may be provided while movie theater offers would not be. In contrast, in a case where the user expresses the same intention however has selected the top persona, may result to offers from movie theater being presented while offers for home entertainment would not be.

The menu 704 may include a privacy menu including a plurality of privacy settings (e.g., shown as selection items 705) which define a privacy policy (of the user) and may be selected by the user to set a desired privacy settings. The privacy settings may be presented to the user for selection each time or previously set by the user. Further, a default privacy setting may also be selected or used. With regard to the selection items 705, they may be colored to indicate privacy settings (e.g., red=low privacy, green=high privacy, yellow=mid privacy setting). Further, when a user double clicks or otherwise selects one or the selection items 705, the system may present the user with a detailed description of the selected privacy setting such as shown in menu items in areas 804 and 806 of FIG. 8. The persona and/or privacy settings may be selected/set at the same time or at different times, as desired. Text entry box 706 may be provided for a user to enter a message including an intention or other operators when using the system (e.g., see, act 401). Further, in accordance with embodiments of the present system, each of the personas and privacy setting may be associated with a given user (e.g., customized for/by the user). In other words, each of the plurality of personas and privacy settings may be selected to represent the user at a given time to enable a given user to express different personalities, for example, that are each personalities of the user. In this way, in accordance with embodiments of the present system, the user may change personas/privacy settings to suit the user as they choose at a given time without requiring an extended selection process wherein each of a plurality of traits (either persona or privacy related) needs to be separately selected.

In other words and in accordance with these embodiments, the user may select a persona/privacy setting which each alters/selects a plurality of traits that are utilized for filtering vendor offers.

FIG. 8 shows a screen shot 800 of a menu items presented to a user illustrating how privacy setting may be utilized for obscuring data that might otherwise be presented a vendor. With reference to FIG. 8, the user may select and/or change privacy settings 804, for example, associated with the user and one of the selection items 705 shown in FIG. 7. As shown, each of the selection items 705 may set a plurality of privacy policy settings which affects how raw user data may be obscured prior to be provided to a vendor in response to a request from the vendor for user context. Further, items in menu 800 may be derived from previous messages, location information of an MS of the user, etc. Drop down menus or other types of selections may be provided to the user such that the user may hide or otherwise obscure the user's personal data. For example, a user living in San Francisco, Calif., may choose to hide their city of residence while not hiding their state of residence. The user may then save settings and the system may update corresponding privacy policy information, personal information, etc. in the user context information.

Thus, FIG. 7 illustrates how a user may select a profile (e.g., a context) which may include information selected from personal data which, for example, may be aggregated by crawling one or more SN applications (e.g., Twitter™, Facebook™, etc.), vendor accounts, banks, telephone accounts, etc., of the user and aggregating information related to the user. The user may further refine and/or select a privacy policy which may control the granularity with which the aggregated SN information (e.g., user context information) is revealed to third party applications as illustrated by FIG. 8.

FIG. 9 shows a screen shot of SN page 900 in accordance with embodiments of the present system. The page may correspond with, for example, a "planning to buy" page on which a plurality of user's may post information such as requests for proposals (e.g., an intention of the user), etc. For example, the SN page 900 may include an intention portion 902, a description portion 904, and a context link portion 906. Accordingly, when the user submits an intention such as an RFP, the system may post this intention in the intention portion 902.

The context link included in the context link portion 906 may contain the user's data encoded in a machine-readable format such as vCard, XML or other structured or unstructured format and may include a link, an address, and/or other suitable links which may be selected by, for example, the vendor portion (e.g., 114, 408) to access information (e.g., via an address, a page, etc.) related to the user context and/or message context information which may be accessible to the vendor and may be used to populate CRM information of a vendor. Accordingly, information at the linked to address may be used to populate CRM information of a vendor as will be shown below with reference to FIG. 12. The vendor may further filter this information in accordance with CRM information.

The description portion 904 may include a hashtag which may be generated by the present system either randomly from a set of relevant descriptors (eg. #rfp, #need, #want, #plan) or through the use of semantic technologies (such as OpenCalais™) to extract entities from the body of the message and to use them as descriptive hashtags (for example the body of the message "My cat is getting hungry" could yield the entities "pet" and "food" which may be formed into the hashtags "#pet" and "#food", respectively). Hashtags are interesting as they may help the vendors narrow down their search when listening to messages from the users. A vendor may indeed only monitor a set of hashtags that correspond to its business.

Accordingly, the SN page 900 illustrates an intention published publicly using a page which reveals the information the user has chosen to share (via their 'persona' and 'privacy policy'), in accordance with embodiments of the present system.

Exemplary screen shots from a CRM system in accordance with the present system which may be used by businesses to track their interactions with customers and potential customers, from initial contact, to qualifying their need, creating an 'opportunity' and managing the progress of the customer through the sales process are illustrated below with reference to FIGS. 10 through 12.

Figure 10:
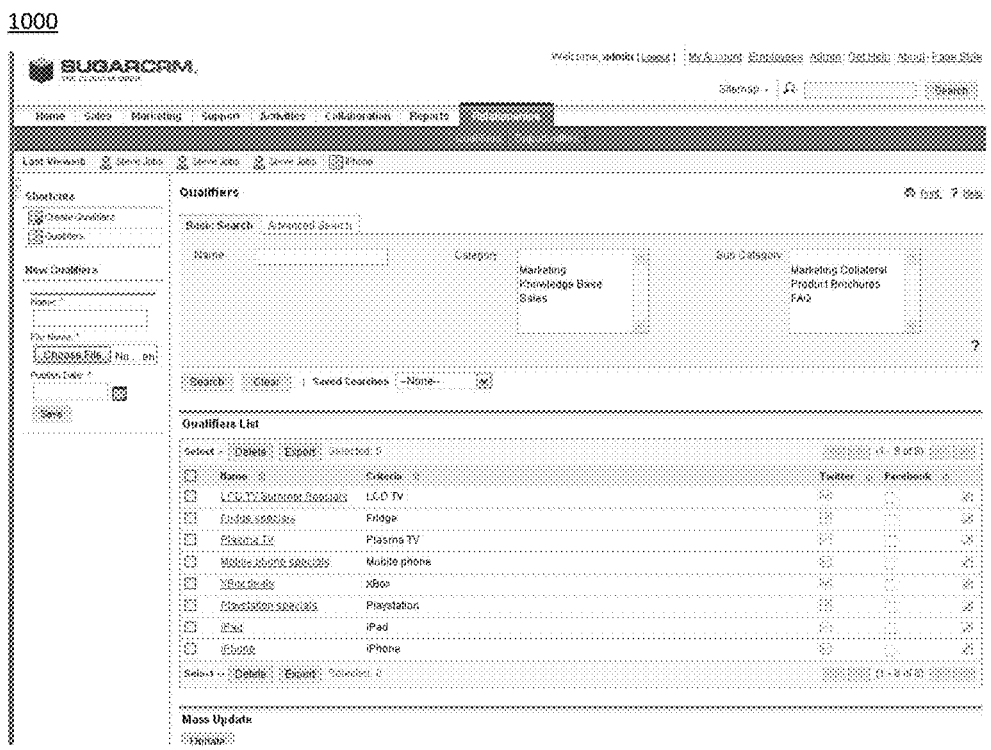
FIG. 10 shows a screen shot of a page in accordance with embodiments of the present system.

FIG. 10 shows a screen shot of a page 1000 in accordance with embodiments of the present system. Page 1000 may illustrate a page generated by a CRM system used, for example, at a vendor side (e.g., used by a vendor) and which may be configured to monitor social networks for terms described in the filters (e.g., qualifiers). Accordingly, the vendor may set a configuration of selections as shown on this page.

Figure 11:
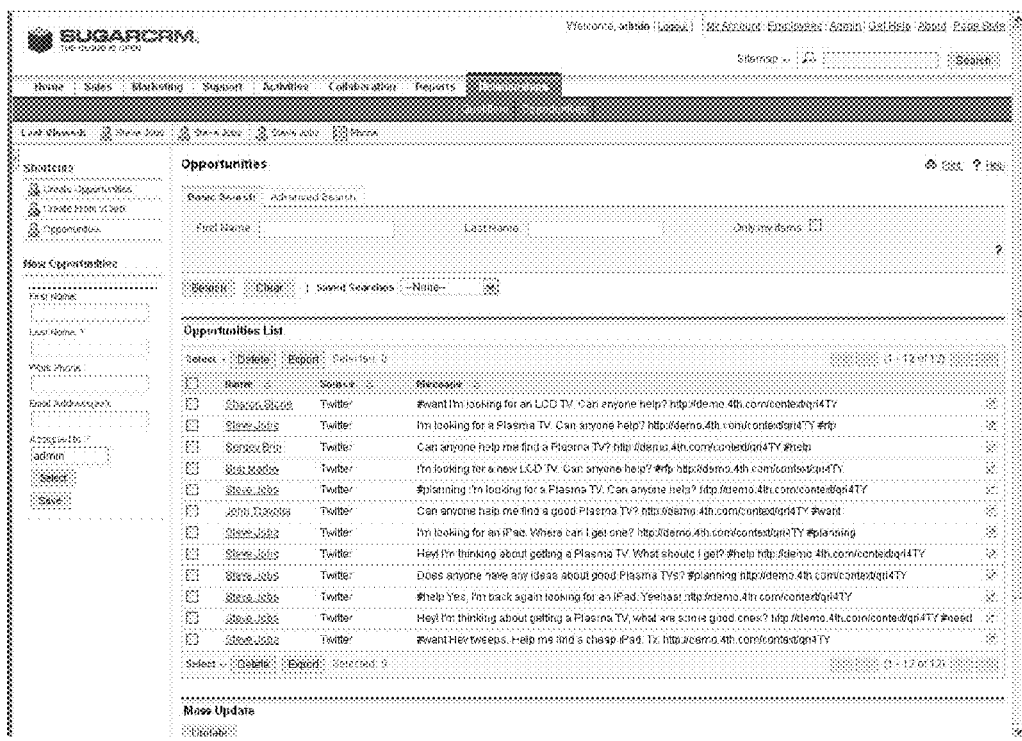
FIG. 11 shows a screen shot of a page in accordance with embodiments of the present system.

FIG. 11 shows a screen shot of a page 1100 in accordance with embodiments of the present system. Page 1100 may illustrate a page generated by a CRM system used, for example, at a vendor side and which may be configured to monitor social networks for intentions matching the qualifiers and which may be automatically captured as "Opportunities" in accordance with a CRM workflow. The vendor may set a configuration of selections in this page. Thus, using the present system the relationships may be initiated, developed, used, and/or maintained between a user and a vendor or other type of entity. Four exemplary relationships types which may occur in order will now be illustrated as defined below.

Initiating a relationship (intention+user context+privacy policy)

Example—User Joe is thinking about eating vegetarian food tonight ('intention'). He wants to know about options nearby, so he uses an embodiment of the present system to connect to his Facebook profile where he selects his name and address ('context')— 'Joe Bloggs, 123 Main Street, San Francisco, Calif.'. Joe doesn't want to tell the world where he lives, so he chooses a 'privacy policy' (i.e. restriction information) which only shows the 'city' part of his user context information. He uses this restricted view of his context to publish his 'intention' anonymously on social media channels. For instance, the intention is published anonymously through a message on an SN platform along with a link information to his user context information. Provided a vendor listen to food intents (e.g. using the hashtag "#food" the present system added to the anonymous message), this vendor can send a request for accessing Joe context information using the link information. As the restriction information allows only the city part to be visible, the vendor will receive only the neighborhood of Joe through for instance his zipcode). Provided a transaction is performed between a vendor and Joe, the privacy settings may change the next time the same vendor requests Joe anonymous twits or facebook page, as provided by the present system.

Developing a relationship (same intention+same user context+different privacy policy)

Example—A restaurant chain in San Francisco detects Joe's message talking about looking for Vegetarian food and responds with a map showing the locations of their restaurants in the city. The company asks Joe to share the time and date he'd like to eat so they can provide/filter the list to restaurants that are open near him. As he will be in the restaurant and may desire to be identified using his true identity (necessary when using for example, a credit card to pay for services), Joe may release his true identity by changing his privacy policy settings by, for example, selecting a new privacy setting of a plurality of privacy settings. Accordingly, the context will now be filtered and made available to the restaurant chain in accordance with the different privacy policy.

Using a relationship (different intention+same user context+same privacy policy)

Example—A month later Joe is organizing a party for a friend. He publishes his intention publicly. Once again the restaurant 'hears' his intention (either by monitoring the hashtags, or following the anonymous Twitter™ or Facebook™ accounts provided by the present system) and because it knows what he ordered last time, replies suggesting a few additional dishes he and the party might like. He uses the same user context and the same privacy policy as in the previous developing relationship example.

Maintaining a relationship ((established relationship)+different user context+same privacy policy)

Example—A couple of months later, Joe is going to see a movie at a cinema which is close to the restaurant he went to earlier. Because Joe had a good experience, he allowed the restaurant access to his future plans using a scheduling application such as Plancast™ which may be accessed by the restaurant with which he has a relationship. Joe publicizes (e.g., at a SN site) his plan to see a movie at a cinema in proximity to the restaurant. The restaurant's system is notified of Joe's plan and since the restaurant is near the cinema, it sends him an offer of a free drink with his meal (because Joe selected to maintain a relationship with the restaurant). Joes user context information includes different location information and is different from the previous example. But, the privacy policy has not been changed.

Figure 12:
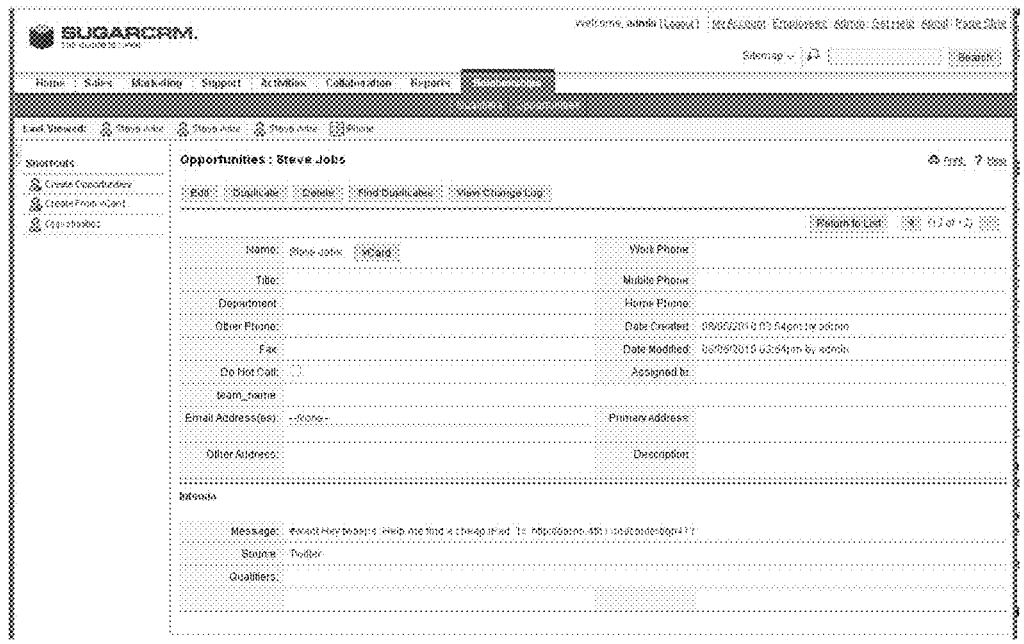
FIG. 12 shows a screen shot of a page in accordance with embodiments of the present system.

FIG. 12 shows a screen shot of a page 1200 in accordance with embodiments of the present system. Page 1200 may illustrate a page generated by a CRM system used, for example, at a vendor side. Page 12 illustrates contact information populated by the system when the CRM system accesses a context link (e.g., see, 904 FIG. 9) embedded in the SN page such as the SN page 900.

Figure 13:
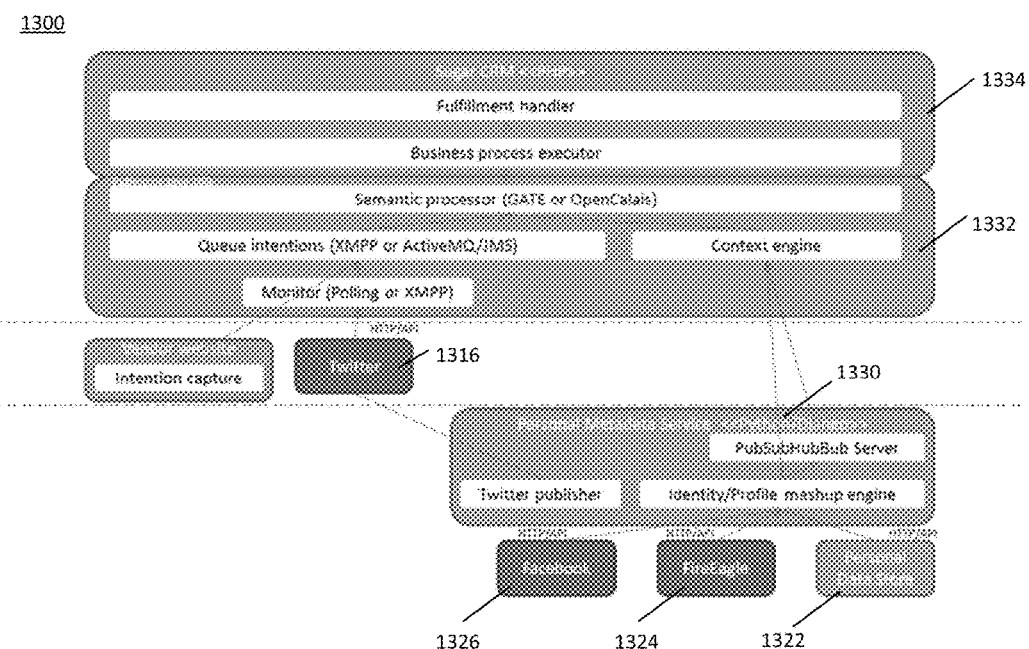
FIG. 13 shows a system architecture in accordance with embodiments of the present system.

FIG. 13 shows a system architecture 1300 in accordance with embodiments of the present system. The system architecture may include portions 1302 through 1334. The Personal Metadata Service 1330 accesses, for example, information from existing personal data repositories 1322, 1324, and/or 1326. Subsets of this personal data may be aggregated to form 'personas'. The Personal Metadata Service 1330 enables messages to be published to one or more social networks 1316. A CRM system 1332 which may monitor the one or more social networks 1316 may detect messages published from the Personal Metadata Service 1330 and ingests them into a process which may examine a semantic nature of the message (e.g., what subject categories does the message describe). An example might be recognizing that a "Plasma TV" is a type of "Electronic product" and a type of "Television". Once messages have been interpreted they may be passed to a Fulfillment processor 1334 which may manage the response of the vendor to the message (e.g., should an email be sent to the customer, should a product be shipped, is follow-up required to clarify the user's intent and/or context).

The architecture may represent an end-to-end architecture in accordance with embodiments of the present system. However, it is also envisioned that other architectures may also be used. Moreover, portions of the architecture may be separated or combined with each other. Further, it is envisioned that the one or more portions of the architecture may be located locally or remotely from each other.

Accordingly, the present system may provide a personal metadata service to a plurality of users may use one or more embodiments of the present system to conveniently publish intent and/or control what they share of their context. Businesses may be able to hear the customer's intent, take into consideration their context and/or respond through an appropriate channel. Accordingly, a business relationship may be formed and/or maintained between a user and a vendor.

Figure 14:
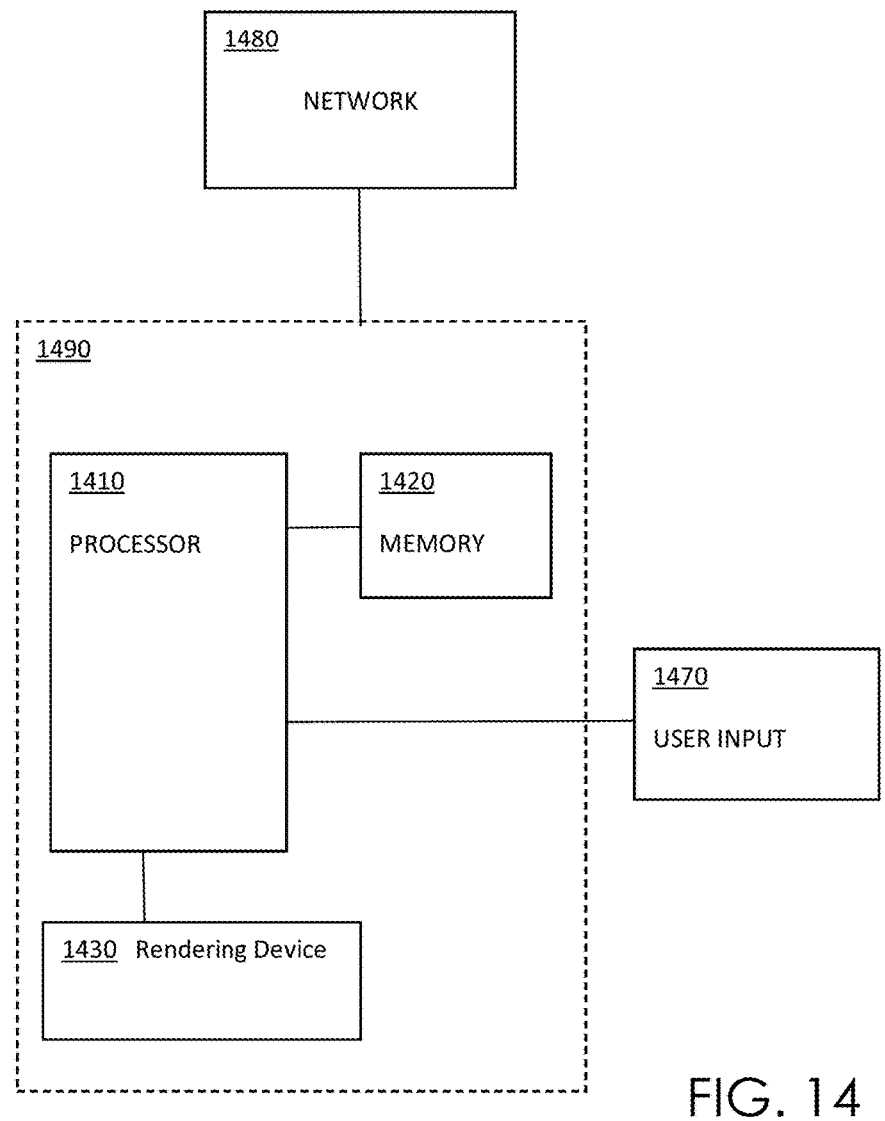
FIG. 14 shows a portion of a system (e.g., peer, server, etc.) in accordance with embodiments of the present system.

FIG. 14 shows a portion of a system 1400 (e.g., peer, server, user station, etc.) in accordance with embodiments of the present system. For example, a portion of the present system may include a processor 1410 operationally coupled to a memory 1420, a display 1430 and a user input device 1470. The memory 13420 may be any type of device for storing application data as well as other data related to the described operation. The application data and other data are received by the processor 1410 for configuring (e.g., programming) the processor 1410 to perform operation acts in accordance with the present system. The processor 1410 so configured becomes a special purpose machine particularly suited for performing in accordance with the present system.

The operation acts may include requesting, providing, and/or rendering of content such as vendor offers to a user. The user input 1470 may include a keyboard, mouse, trackball or other device, including touch sensitive displays, which may be stand alone or be a part of a system, such as part of a personal computer, personal digital assistant, mobile phone, set top box, television or other device for communicating with the processor 1410 via any operable link. The user input device 1470 may be operable for interacting with the processor 1410 including enabling interaction within a UI as described herein. Clearly the processor 1410, the memory 1420, display 1430 and/or user input device 1470 may all or partly be a portion of a computer system or other device such as a client and/or server as described herein.

The methods of the present system are particularly suited to be carried out by a computer software program, such program containing modules corresponding to one or more of the individual steps or acts described and/or envisioned by the present system. Such program may of course be embodied in a computer-readable persistent memory medium, such as an integrated chip, a peripheral device or memory, such as the memory 1420 or other memory coupled to the processor 1310.

The program and/or program portions contained in the memory 1420 configure the processor 1410 to implement the methods, operational acts, and functions disclosed herein. The memories may be distributed, for example between the clients and/or servers, or local, and the processor 1410, where additional processors may be provided, may also be distributed or may be singular. The memories may be implemented as electrical, magnetic or optical memory, or any combination of these or other types of storage devices. Moreover, the term "memory" should be construed broadly enough to encompass any information stored in a persistent memory medium that is able to be read from or written to an address in an addressable space accessible by the processor 1410. With this definition, information stored in a persistent memory medium and accessible through a network is still within the memory, for instance, because the processor 1410 may retrieve the information from the network for operation in accordance with the present system.

The processor 1410 is operable for providing control signals and/or performing operations in response to input signals from the user input device 1470 as well as in response to other devices of a network and executing instructions stored in the memory 1420. The processor 1410 may be an application-specific or general-use integrated circuit(s). Further, the processor 1310 may be a dedicated processor for performing in accordance with the present system or may be a general-purpose processor wherein only one of many functions operates for performing in accordance with the present system. The processor 1410 may operate utilizing a program portion, multiple program segments, or may be a hardware device utilizing a dedicated or multi-purpose integrated circuit.

Accordingly, the present system may operate as a semantic enterprise conferencing solution which may understand and analyze an "issue" triggered within an enterprise. The system may then semantically determine relevance of users to the issue and thereafter select a group of users who are who are most relevant to the issue and contact these users to establish a communication between these users and the system. Accordingly, the system may establish communication between a user station and an advertising server in accordance with desired conditions.

Further variations of the present system would readily occur to a person of ordinary skill in the art and are encompassed by the following claims. Through operation of the present system, a virtual environment solicitation is provided to a user to enable simple immersion into a virtual environment and its objects.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A communication method to establish a relationship between a user and one or more third party servers, the user being associated to user context information, the communication method performed by one or more controllers, the method comprising acts of:

receiving a message from a user station of the user;

processing the received message to anonymize the message to conceal an identity of the user and to attach link information to the anonymized message where the link information provides a link to the user context information where the user context information comprises information obtained by parsing one or more of user profile information and user message information at one or more social network applications to which the user subscribes;

publishing the anonymized message together with the attached link information;

receiving a message from a third party server of the one or more third party servers, wherein the received message from the third party server uses the link information to request the user context information;

providing the user context information to the third party server;

receiving an engagement content message at a proxy server from the third party server after the user context information is sent to the third party server; and transmitting the received engagement content message from the proxy server to a contact address of the user.

2. The communication method of claim 1, further comprising an act of forming the link information, and associating the link information with the user context information.

3. The communication method of claim 1, wherein the anonymized message includes a message portion and a tag portion.

4. The communication method of claim 1, further comprising an act of determining a context of the message from the user station by determining one or more of an indication of interest need, want, desire, plan, intent, location, and intended destination of the user.

5. The communication method of claim 1, wherein providing the user context information to the third party server comprises determining which context information to provide based on a privacy policy selected by the user.

6. The communication method of claim 1, wherein the act of publishing the anonymized message together with link information to the user context information comprises a preliminary act of associating the user to an anonymous social network account, the publishing act comprising the publishing of the anonymous message through the anonymous social network account.

7. The communication method of claim 1, wherein providing the user context information to the third party server comprises:
  verifying restriction information in accordance with a user persona selected by the user from a plurality of user personas that are each associated with the user; and
  providing the user context information in accordance with the restriction information.

8. A communication system to establish a relationship between a user and one or more third party servers, the user being associated to user context information, the communication system comprising:
  at least one controller comprising a memory device storing instructions and a processor configured by instructions stored in the memory device to:
  receive a message from a user station of a user;
  process the received message to anonymize the message to conceal an identity of the user;
  publish the anonymized message together with link information to the user context information where the user context information comprises information obtained by parsing one or more of user profile information and user message information at one or more social network applications to which the user subscribes;
  receive a message from a third party server of the one or more third party servers, wherein the received message from the third party server uses the link information to request the user context information;
  provide the user context information to the third party server;
  receive an engagement content message from the third party server after the user context information is sent to the third party server; and
  transmit the engagement content message to a contact address of the user.

9. The communication system of claim 8, wherein the at least one controller is configured to associate the link information with the user context information and insert the link information into the anonymized message.

10. The communication system of claim 8, wherein the at least one controller is configured to parse one or more social network applications to which the user subscribes and to form the user context information based upon the parsed information.

11. The communication system of claim 10, wherein the at least one controller is configured to parse one or more of user profile information and user message information at the one or more social network applications to which the user subscribes.

12. The communication system of claim 8, wherein the at least one controller is configured to form the anonymized message to comprise a message portion and a tag portion.

13. The communication system of claim 8, wherein the at least one controller is configured to determine a context of the current message by determining one or more of an indication of interest need, want, desire, plan, intent, location, and intended destination of the user.

14. The communication system of claim 8, wherein the at least one controller is configured to:
  request a user to select a privacy policy from a plurality of privacy polices associated with the user; and
  update restriction information in accordance with the selected privacy policy.

15. The communication system of claim 8, wherein the at least one controller is configured to
  associate the user to an anonymous social network account, and
  publish the anonymous message through the anonymous social network account.

16. The communication system of claim 8, wherein providing the user context information to the third party server comprises:
  verifying restriction information in accordance with a user persona selected by the user from a plurality of user personas that are each associated with the user; and
  providing the user context information in accordance with the restriction information in response to the request.

17. A network controller to establish a relationship between a user and one or more third party vendors, the user being associated to user context information, the controller comprising:
  a memory device storing instructions; and
  a processor configured by the instructions to:
  receive a message from a user station of the user;
  process the received message to anonymize the message to conceal an identity of the user;
  publish the anonymized message together with link information to the user context information where the user context information comprises information obtained by parsing one or more of user profile information and user message information at one or more social network applications to which the user subscribes;
  receive a message from a third party vendor of the one or more third party vendors, wherein the received message from the third party vendor uses the link information to request the user context information.

18. The network controller of claim 17, further comprising providing the user context information to the third party server through steps comprising:
  verifying restriction information in accordance with a user persona selected by the user from a plurality of user personas that are each associated with the user; and
  providing the user context information in accordance with the restriction information in response to the request.

19. A non-transitory computer-readable medium comprising an application stored thereon to establish a relationship between a user and one or more third party servers, the user being associated to user context information, the application causing a computer to implement a method of establishing the relationship between the user and the one or more third party servers when the application is executed by the computer, the application comprising instructions configured to:
  receive a message from a user station of the user;
  process the received message to anonymize the message to conceal an identity of the user;
  publish the anonymized message together with link information to the user context information where the user context information comprises information obtained by parsing one or more of user profile information and user message information at one or more social network applications to which the user subscribes;
  receive a message from a third party server of the one or more third party servers, wherein the received message from the third party vendor uses the link information to request the user context information;

provide the user context information to the third party server;
receive an engagement content message from the third party server after the user context information is sent to the third party server; and
transmit the engagement content message to a contact address of the user.

* * * * *